(12) United States Patent
Ackerman et al.

(10) Patent No.: US 7,686,905 B2
(45) Date of Patent: Mar. 30, 2010

(54) COPPER GRID REPAIR TECHNIQUE FOR LIGHTNING STRIKE PROTECTION

(75) Inventors: Patrice K. Ackerman, Kent, WA (US); Steven D. Blanchard, Issaquah, WA (US); Daniel J. Kovach, Kent, WA (US)

(73) Assignee: The Boeing Company, Chicago, IL (US)

( * ) Notice: Subject to any disclaimer, the term of this patent is extended or adjusted under 35 U.S.C. 154(b) by 369 days.

(21) Appl. No.: 11/220,046

(22) Filed: Sep. 6, 2005

(65) Prior Publication Data

US 2007/0177330 A1 Aug. 2, 2007

(51) Int. Cl.
*B32B 43/00* (2006.01)

(52) U.S. Cl. ............... 156/94; 264/258; 244/131
(58) Field of Classification Search .......... 156/94; 264/258; 244/131; 361/218, 219
See application file for complete search history.

(56) References Cited

U.S. PATENT DOCUMENTS

| | | | |
|---|---|---|---|
| 4,789,918 A | 12/1988 | Bannink | |
| 4,891,732 A | 1/1990 | Jones | |
| 4,912,594 A | 3/1990 | Bannink | |
| 5,236,646 A * | 8/1993 | Cochran et al. | 264/102 |
| 5,499,782 A * | 3/1996 | Domine | 244/1 A |
| 5,845,872 A | 12/1998 | Pridham et al. | |
| 5,865,397 A | 2/1999 | Gerrmann | |
| 5,882,756 A | 3/1999 | Alston | |
| 6,156,248 A * | 12/2000 | Walling | 264/36.2 |
| 2001/0053820 A1 * | 12/2001 | Yeager et al. | 525/186 |
| 2002/0180077 A1 | 12/2002 | Glatkowski | |

* cited by examiner

*Primary Examiner*—Richard Crispino
*Assistant Examiner*—Christopher Schatz
(74) *Attorney, Agent, or Firm*—Ostrager Chong Flaherty & Broitman, P.C.

(57) ABSTRACT

A method for reestablishing the electrical continuity of an electrically conductive layer of a composite aircraft wing damaged by a lightning strike or other mechanical event is disclosed in which a copper patch replaced the damaged section of the electrically conductive layer contained. The repair is performed by first removing any surfacers, fasteners, and damaged electrically conductive layer to expose a portion of the underlying composite skin. A copper patch having a copper foil section coupled to an unsupported film adhesive is then introduced onto an underlying composite skin opening contained within an undamaged section of a copper foil grid and covered with resin-impregnated fiberglass material. The film adhesive and resin-impregnated fiberglass material are then cured and fasteners are then reinserted within the fiberglass material, copper patch and underlying composite skin. The surface of the composite wing is then reprimed and repainted to complete the repair.

17 Claims, 4 Drawing Sheets

COPPER GRID REPAIR TECHNIQUE FOR LIGHTNING STRIKE PROTECTION

TECHNICAL FIELD

The disclosure generally relates to aircraft lightning protection techniques and more specifically to a copper grid repair technique for composite aircraft skin panels.

BACKGROUND ART

The use of carbon fiber reinforced plastic ("CFRP") materials, otherwise known as carbon fiber composites, for structural members is increasing in commercial airplanes because of the higher strength-to-weight and stiffness-to-weight ratios afforded by carbon fiber composites as compared to traditional aluminum structures.

A lightning strike to an aircraft may cause a high electric current, which may typically be of the order of 100,000 amps, to flow through the aircraft frame. In a carbon fiber composite structure, the carbon fiber plies may act as very high resistance conductors and the resin between the plies may act as highly capacitive dielectric layers so that lightning striking the carbon fiber composite results in an increasing potential difference produced across the ply structure but no readily available electrically conductive path for discharging the current. The current may concentrate at the fasteners joining between the skin panels and the aircraft substructure, since the fasteners are generally made of highly conductive alloys for strength. When the lightning energy is unable to dissipate at a fast enough rate, undesirable arcing and dangerous sparks may occur.

One known approach to reduce the effect of lightning strikes on non-metallic structures is to apply, by flame spraying or plating, a conductive layer such as aluminum to the outer surface of the skin panels. The problem with flame spraying or plating is that they are secondary operations used to apply the conductive layer to the already assembled structure. In addition, it is difficult to achieve a satisfactory electrical bond using either of these processes. The protective conductive layer also adds mass without contributing to the strength of the assembled structure, is vulnerable to environmental damage, and is difficult to maintain. The production and maintenance of such an arrangement is thus clearly expensive.

Another known approach to reduce the effect of lightning strikes on non-metallic surfaces is to install a conductive woven screen or foil to the outer surface of the skin panels. However, the use of woven screens or foils requires the use of an additional ply of fiberglass when the non-metallic structure is carbon to electrically isolate the carbon layer from the metal to prevent corrosion that also adds non-structural weight.

Yet another approach is to employ various special designs of fastener, for example as disclosed in U.S. Pat. No. 4,891,732. The fasteners disclosed in these patents employ a beveled head for countersinking into the surface of the skin panel into intimate contact therewith, and a nut for securing the fastener in place, which nut is designed to transmit electric current safely to the substructure such that arcing will not occur. Again, this approach to the problem of arcing is expensive because of the need for special fastener designs.

Still another known method for protecting fuel systems from lightning strikes is described in U.S. Pat. No. 5,845,872 to Pridham et al., which is herein incorporated by reference, which discloses a method for fastening an outer composite aircraft skin to an inner substructure including the steps of incorporating an electrically conductive layer in or applying it to an outer surface of the outer composite skin, inserting a bolt through the electrically conductive layer and outer composite skin and through the inner substructure, securing the bolt by means of a nut directly or indirectly engaging the inner surface of the inner substructure, and applying insulating material over the head of the bolt. While the Pridham disclosure effectively protects the fuel system from lightning strikes, the proposed system does not address the need for repairing the copper grid system after a lightning strike or after other mechanical damage. The electrical continuity of the electrically conductive layer must be reestablished to provide proper lightning strike protection.

There thus exists a need for an inexpensive and robust technique for repairing outer composite aircraft skins that utilize copper foil along fastener rows for lightning strike protection that have been damaged by lightning strikes or in some type of mechanical manner in order to maintain the integrity of the lightning prevention system to help divert lightning currents away from the fuel tank substructures.

SUMMARY OF THE INVENTION

The disclosure provides a method for reestablishing the electrical continuity of an electrically conductive layer, preferably a copper foil grid that includes strips of copper foil coupled to and centered around fasteners located in a fastener line on the composite aircraft wing, that has been previously damaged mechanically or by a lightning strike. The disclosure utilizes a copper patch and a specialized adhesive to replace the damaged section of the electrically conductive layer.

In one preferred embodiment, the repair is performed by first removing any surfacers (paints, primers, fiberglass layers) as well as a portion of the electrically conductive layer to create an opening to the underlying composite skin. Any fasteners in the immediate area of the damage are also removed. A copper patch consisting of an unsupported film adhesive and a copper foil strip is then bonded and cured over to the composite skin within the opening. One ply of resin-impregnated fiberglass is then wet-layed over the surface of the copper patch and cured. Holes are drilled through the cured fiberglass plies and copper patch and the fasteners are reinstalled. This allows the fasteners to be recoupled to the underlying composite skin and copper foil. The primer and paint are then reapplied and cured over the fiberglass to complete the repair.

In another preferred embodiment, the repair is performed by first removing any surfacers (paints, primers, fiberglass layers) as well as a portion of the electrically conductive layer to create an opening to the underlying composite skin. Any fasteners in the immediate area of the damage are also removed. A copper patch consisting of an unsupported adhesive film and a copper foil strip is then placed within the opening such that the adhesive is contained between the copper foil strip and the underlying composite skin. One ply of a fiberglass prepreg material is then applied over the copper patch. The prepreg and film adhesive are then preferably cured simultaneously in a single step under heat and pressure, although alternatively they may be cured individually after application. Holes are drilled through the fiberglass layer and copper patch and the fasteners are reinstalled. This allows the fasteners to be recoupled to the underlying composite skin and copper skin. The primer and paint are then reapplied and cured over the fiberglass prepreg to complete the repair.

The techniques of the preferred embodiments described above are relatively simple and available to make quick and cost-effective repairs to commercial aircraft already in service. This repair helps to maintain the integrity of the lightning prevention system by providing a lower resistance path along the wing's surface. The repair also maintains the reduction of current density at the target fasteners by allowing current sharing to the neighboring fasteners due to the reduced parallel path resistance created by the copper foil. The repairs allow the commercial aircraft to be placed back in service quickly and at a minimum of time and expense.

Other features, benefits and advantages of the disclosure will become apparent from the following description of the embodiments, when viewed in accordance with the attached drawings and appended claims.

Best Modes

Figure 1:
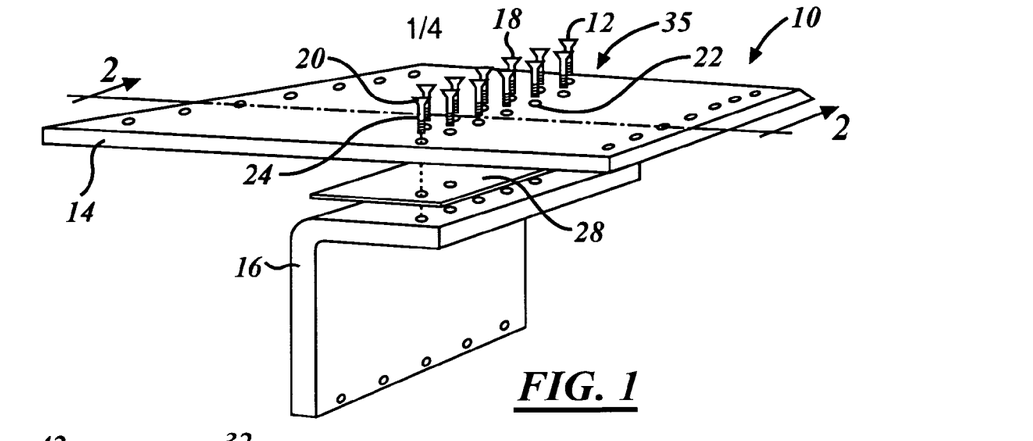
FIG. 1 is a perspective view of a composite wing structure of a commercial airplane.
Figure 2:
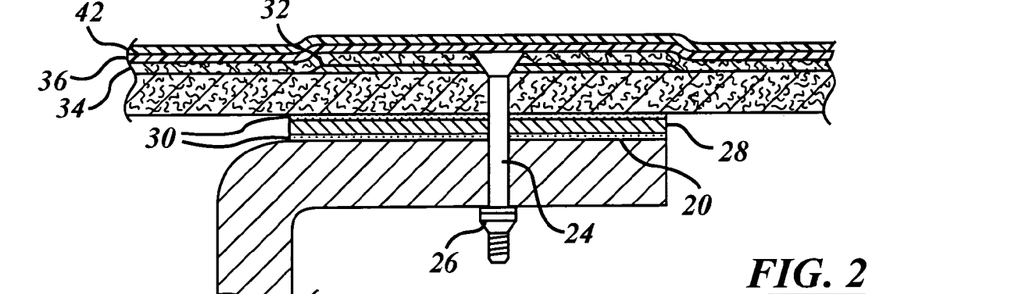
FIG. 2 is a section view of a portion of FIG. 1 taken along line 2-2.

Referring now to FIGS. 1 and 2, a section and perspective view of a portion of a wing structure 10 of a commercial airplane showing a plurality of fasteners 12 is shown securing a skin panel 14 of an aircraft structure to an inner substructure 16, or spar 16, comprising the wall of a fuel tank.

The skin panel 14 and the spar 16 are made of carbon fiber composite material of low weight and high strength and stiffness formed by conventional methods well known in the art. For example, in one preferred form, the skin panel 14 is formed from 34 plies of an aircraft quality, machine lay-up structural carbon fiber/epoxy tape laid in a 50/40/10 orientation and having an overall thickness approximately 0.2516 inches, while the spar 16 consists of 44 plies of a hand lay-up version of aircraft quality, structural carbon fiber/epoxy tape laid in a 25/50/25 layup and having an overall thickness of about 0.3256 inches. Both the skin panel 14 and spar 16 are primed on both the tool and bag side prior to installation.

The fastener 12 is made of metal such as titanium and comprises a bolt 18, preferably a Hi-Lok bolt (or e.g., a Lockbolt, Eddiebolt or Sleeved Lockbolt) with a preload shear, having a beveled head 20, which is countersunk into a correspondingly shaped opening 22 in the skin panel 14, and a shank 24 (0.25 inch diameter bare titanium with a 100 degree shear head), which passes through the skin panel 14 and spar 16 to be secured by a metallic nut 26 engaging the spar 16. A sealant (not shown) is introduced to the shank 24 prior to installation into the spar 16 and skin panel 14. A shim 28, preferably an insulating shim, about 2 mils in thickness, is interposed between the skin panel 14 and the spar 16 as a filler to make up for differences in the thickness of the skin panel 14. The shim 28 is sealed to the panel 14 and spar 16 using a fay sealant 30.

The fastener 12 also secures an electrically conductive layer, preferably a copper foil grid 32 in the form of a plurality of strips 33, and a fiberglass ply layer 34, respectively, to the skin panel 14. The grid 32 is therefore considered an integral part of the skin 14. The aircraft wing structure 10 is coated with one or more primer coats (here shown as a single layer of primer 36) over the outer surface of the skin panel 14, covering both the fiberglass ply layer 34 and the head 20 of the fastener 12, which is flush with the outer surface of the grid 32. One or more layers 42 of paint are then applied over the entire outer surface of the primer 36.

Figure 3:
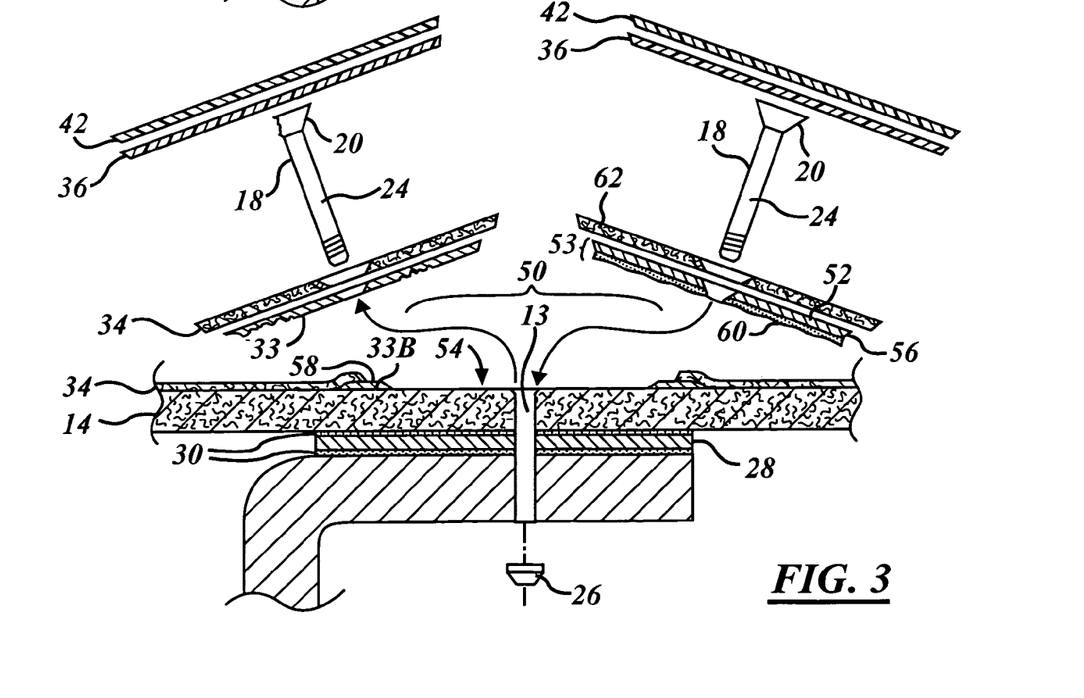
FIG. 3 is a section view of a general method for repairing the damaged portion of the wing structure of FIG. 1 in accordance with the general principals of a preferred embodiment of the disclosure.

Each strip 33, see FIG. 3, of the copper foil grid 32 is a 0.0027 inch thick, 2 ounce/ft$^2$ copper foil such as IPC-4562/Cu-E-2-2-D-S-2 copper foil, which is manufactured by Gould Electronics, Inc. of Chandler, Ariz. The strips 33 are each individually centered along a respective fastener line 35 and are about 3.6 inches wide for a single fastener 12. While not shown in the present illustrations, the strips 33 may overlap depending upon their respective relative location along the spar 16 and skin panel 14. The copper foil grid 32 has sufficient electrical conductivity to meet or exceed IPC-4562 grade specifications to ensure a safe conductive path to divert much of the electric current, generated by lightning strikes in use, away from each respective fastener 12 along a fastener line 35.

The fiberglass ply layer 34 is preferably an epoxy-prepreg material formed with a Style 120 E-glass and a 250-degree Fahrenheit cure thermosetting epoxy resin. Alternatively, a wet lay-up of a similar glass weave (E-glass, Style 108) in a 250-degree Fahrenheit cure thermosetting epoxy resin may also be utilized.

The primer 36 consists of a conventional thermosetting epoxy-based fuel tank primer well known to those of ordinary skill in the art in the aerospace industry. The primer 36 is applied in one or more coats to a dry film thickness of between about 0.5 and 0.9 mils. The primer 36 is air dried for between about 4 hours prior to applications of the overlying paint layers 42.

The paint layer, or layers 42, preferably are formed a conventional, aerospace grade polyurethane enamel that is also well known to those of ordinary skill in the art in the aerospace industry. This polyurethane enamel is preferably applied as a single layer of approximately 2 mil +/−0.1 dry thickness over the previously dried primer 36. If more than about 48 hours has passed since application of the primer 36, it is required to reactivate the surface of the primer 36 by wiping the surface with a solvent such as isopropyl alcohol prior to applying the paint 42. The paint 42 is air dried for between about 4 hours and 7 days to ensure complete curing.

However, after a lightning strike, or due to some other type of mechanical event, one or more strips 33 of the copper foil grid 32 and/or one or more of the fasteners 12 may become damaged such that a safe conductive path cannot be established to divert the electrical current away from the fasteners 12 and along the surface of the wing structure 10 away from the underlying fuel tank substructures. The damaged area 50, as shown in FIG. 3 must be repaired prior to subsequent use of the aircraft. Two preferred methods for repairing the damaged area 50 are proposed herein. Each method removes or repairs a damaged area 50 of any of the copper foil strips 33 of the copper foil grid 32 and introduces a copper patch 53 in its place and are described in logic flow diagrams below in FIGS. 4 and 6, respectively. The resulting repaired structures formed using the logic flow diagrams of FIGS. 4 and 6 are therefore shown in FIGS. 5 and 7, respectively.

Figure 4:
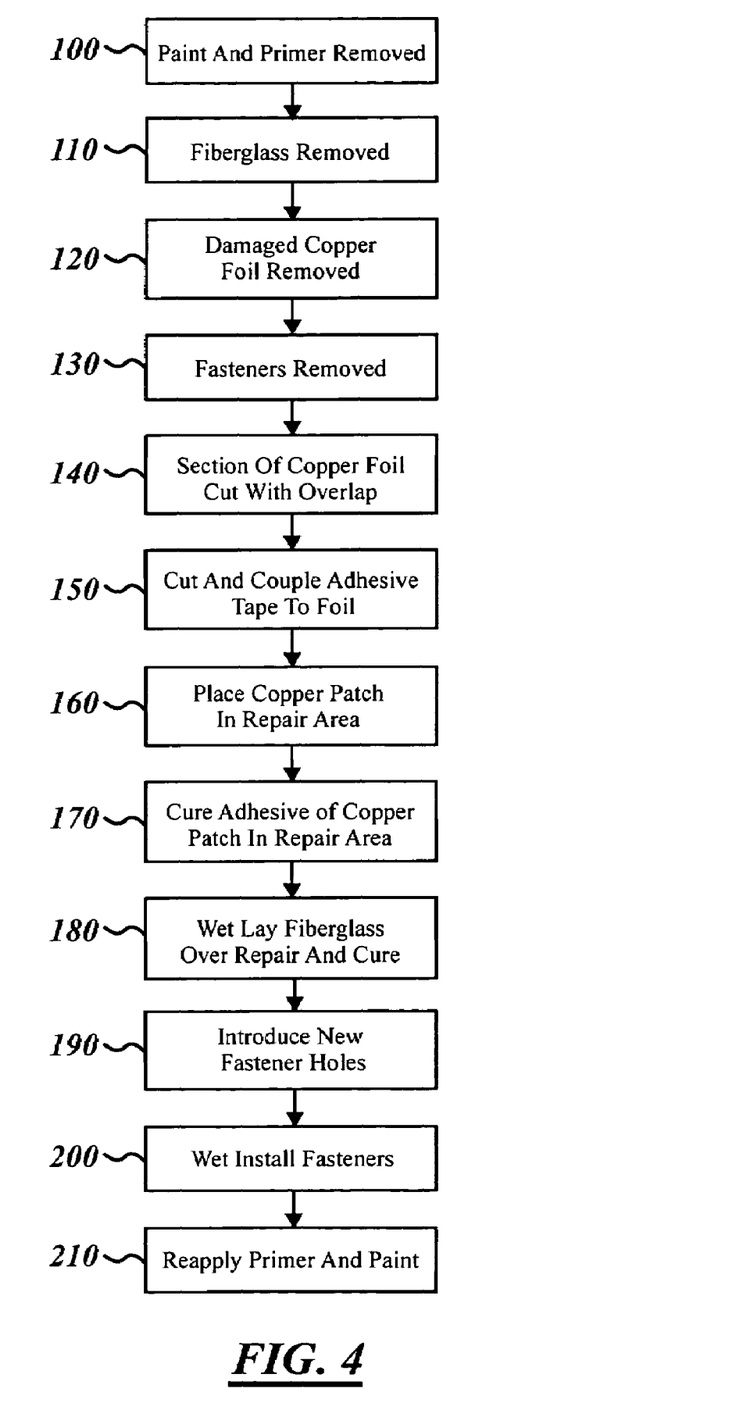
FIG. 4 is a logic flow diagram for repairing a wing structure of FIG. 1 in accordance with one preferred embodiment of the disclosure.

Referring now to FIG. 4, in one preferred method of the disclosure, beginning with Step 100, the paint 42 and primer 36 layers are first removed from the damaged area 50 of the wing structure 10, plus two inches radially at a minimum, with a 150-grit or finer abrasive, ensuring that all of the paint 42 and primer 36 are removed without affecting the underlying fiberglass layer 34.

Next, in Step 110, the composite ply fiberglass layers 34 are removed via a sanding process. In this process, a low or high temperature pressure tape is first applied along the outline of the area to be sanded. Next, the sanding is performed either manually or mechanically using various grits of sandpaper, and diamond or carbide cutting wheels. The sanding is done in either a circular, oblong or semicircular patter based on the defect configuration and location. The area is then finish sanded with 240-grit or finer sandpaper. The fiberglass ply 34 remaining is then unmasked and solvent washed. The sanded area is then wiped dry.

Next, in Step 120, any damaged copper from a strip or strips 33 are carefully removed without impairing the underlying carbon fiber skin 14. For simplicity, in FIG. 3, one damaged strip 33 is illustrated. Undamaged copper foil 33B from each respective damaged strip 33 is maintained in its location on top of the carbon fiber skin 14 around the repair area 54.

In Step 130, the fasteners 12 are removed in the immediate area of the damaged area 50, leaving fastener holes 13 open. The fasteners 12 may or may not have been damaged by a lightning strike or mechanical issue. The fastener holes 13 are then plugged with a ¼inch polytetrafluoroethylene plug. Milled glass and a 150-degree Fahrenheit curing thermosetting epoxy resin are introduced around the plug to fill the countersink around the fastener hole 13. Localized heat of sufficient temperature is introduced near the fastener hole 13 to cure the epoxy resin.

Next, in Step 140, a section of copper foil 52 is cut to fit the repair area 54 with an overlap 56 over the periphery 58 of the underlying remaining copper foil strip 33B surrounding the repair area 54. Typically, this overlap 56 is between one-half and one inch. The copper foil section 52 is formed from the same material and thickness as the original copper strip 33 (preferably Gould IPC-4562/Cu-E-2-2-D-S-2 (0.0027 inches thick, 2 oz.)). The copper foil section 52 is rinsed with isopropyl alcohol, without sanding or abrasion, to prepare the copper foil section 52 for subsequent bonding to an epoxy film adhesive 60.

In Step 150, an epoxy film adhesive 60 is cut to the same size as the copper foil section 52 and coupled to the underside of the copper foil 52 to form a copper patch 53. The epoxy film adhesive 60 is an unsupported adhesive material, meaning that there are no carrier materials utilized. Preferably, the epoxy film adhesive 60 is about 0.005 inches thick and a nominal weight of about 0.030 pounds per square foot. One preferred unsupported modified epoxy film adhesive 60 is FM300-2U, a 250 degree Fahrenheit cure thermosetting epoxy adhesive available from Cytec Engineered Materials of West Patterson, N.J.

In alternative embodiments, a 350-degree Fahrenheit curing thermosetting epoxy adhesive film 60 may be utilized. One such 350-degree Fahrenheit curing thermosetting epoxy adhesive film 60 is AF555 Grade 15U, available from Minnesota Mining & Manufacturing (3M) of St. Paul, Minn.

In Step 160, the copper patch 53 is introduced to the repair area 54 such that the film adhesive 60 covers the underlying skin 14 and overlaps a portion of the outer periphery 58 of the remaining copper strip 33B and such that the copper foil section 52 covers the entire portion of the film adhesive 60. Typically, this is done by first introducing the film adhesive 60 over the skin 14 and overlapping the remaining strip 33B and then introducing the copper foil section 52 onto the film adhesive 60. Alternatively, the film adhesive 60 may first be bonded to the copper foil section 52 to form the patch 53, and the patch is then subsequently introduced as a single unit onto the skin 14 with the adhesive side 60 contacting the skin 14.

Figure 5:
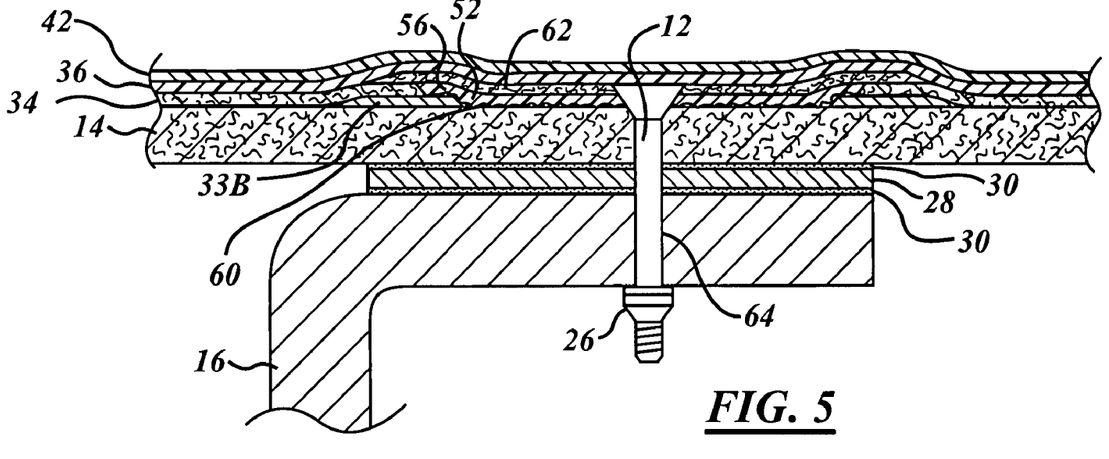
FIG. 5 is a section view of a repaired wing structure of FIG. 1 repaired in accordance with the logic flow diagram of FIG. 4.
Figure 6:
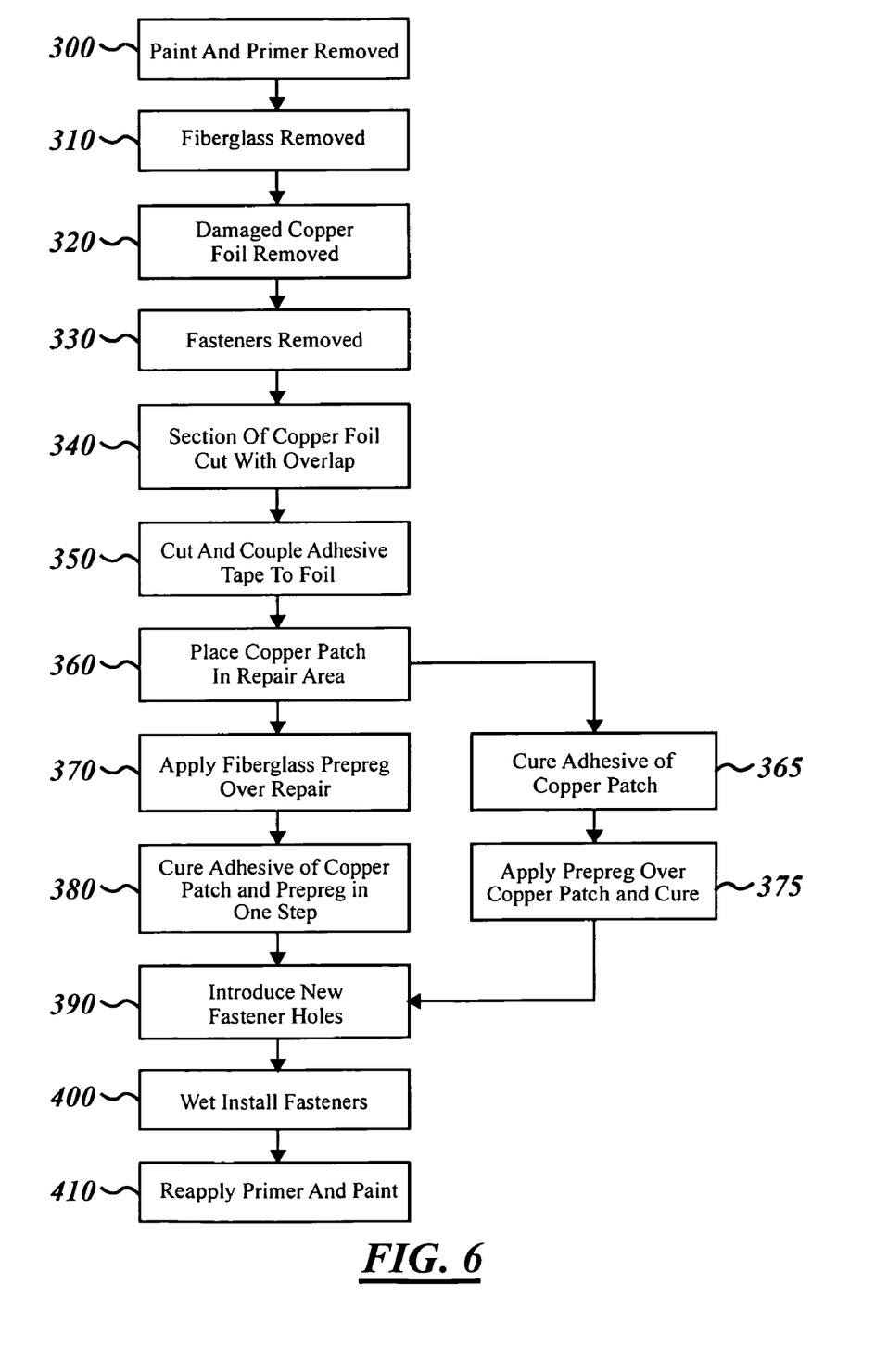
FIG. 6 is a logic flow diagram for repairing a wing structure of FIG. 1 in accordance with another preferred embodiment of the disclosure.

In Step 170, and as best shown in FIG. 5, the copper foil section 52 is bonded onto the remaining underlying copper strip 33B over the repair area 54 in the overlap 56 by curing the epoxy component of the film adhesive 60 to the copper foil section 52, the outer periphery 58 of the copper strip 33B and to the underlying skin 14. For the 250-degree Fahrenheit cure thermosetting epoxy adhesive, a temperature of about 255+/−10 degrees Fahrenheit for about 90 minutes using a vacuum bag technique and a heat blanket is utilized. Most preferably, a vacuum bag is used and maintained at a negative pressure of about 25 in-Hg, while the bag side temperature is ramped up in 5-degree Fahrenheit increments until a heat blanket temperature of about 255 degrees Fahrenheit is reached. The heat blanket temperature is maintained at 255 degrees Fahrenheit for about 90 minutes to ensure complete cure. The heat blanket temperature is then reduced slowly to 140 degrees Fahrenheit before the vacuum bag is removed. The heat blanket is removed after the vacuum bag. To ensure proper temperature control, thermocouples (not shown) are preferably positioned against the skin 14 next to the spar 16 and on the skin side of the spar 16 prior to the curing step.

For a 350-degree Fahrenheit cure thermosetting epoxy adhesive, a temperature of about 355+/−10 degrees Fahrenheit for about 90 minutes using a vacuum bag technique and a heat blanket is utilized. Most preferably, a vacuum bag is used and maintained at a negative pressure of about 25 in-Hg, while the bag side temperature is ramped up in 5-degree Fahrenheit increments until a heat blanket temperature of about 355 degrees Fahrenheit is reached. The heat blanket temperature is then maintained at 355 degrees Fahrenheit for about 90 minutes to ensure complete cure. The heat blanket temperature is then reduced slowly to 140 degrees Fahrenheit before the vacuum bag is removed. The heat blanket is removed after the vacuum bag. To ensure proper temperature control, thermocouples (not shown) are preferably positioned against the skin 14 next to the spar 16 and on the skin side of the spar 16 prior to the curing step.

Next, in Step 180, a layer of a resin-impregnated fiberglass fabric 62 is wet-layed over the cured copper patch 53 with a 0.5-inch overlap over the outer periphery of the patch 53.

To form the resin-impregnated fiberglass fabric 62, otherwise known as a ply 62, a solid parting film at least four inches larger in every direction than the piece of fiberglass fabric being impregnated is first laid on a flat surface. Next, a layer of a 150-degree Fahrenheit curing thermosetting epoxy resin is applied to the parting film. Next, a layer of E-glass fiberglass fabric is applied onto the epoxy resin layer. Another layer of epoxy resin is then applied over the fiberglass fabric. The preferred ratio of resin to fiberglass fabric is between about 1 and 1.5 ounces of resin per ounce of fabric. A second layer of parting film is applied onto the second resin layer. Finally, the resin of the resin layers is uniformly impregnated within the glass fabric using a roller, squeegee or similar device. Most preferably, a vacuum bag is placed over the assembly to facilitate impregnation.

Next, the ply 62 is wet-layed onto the copper patch 53. To accomplish this, the parting film is removed from one side of the ply 62 and the exposed side is layed onto the copper foil section 52. The second piece of parting film of the ply 62 is then removed from the surface opposite the patch 53. The layer 62 is then vacuum bagged to ensure complete infiltration of the additional epoxy resin within the glass fabric 62.

Finally, a heat blanket is coupled to the ply 62 and the epoxy component of the fiberglass fabric 62 layer is cured under vacuum with a heat blanket temperature of about 200+/−10 degrees Fahrenheit for about 220 minutes. The heat blanket is then removed.

Next, in Step 190, new fastener holes 64 are drilled through the cured fiberglass layer 62, the copper patch 53, skin 14, and through into the underlying shim 28 and spar 16. The new fastener holes 64 are inspected to verify location and to confirm shape and size.

In Step 200, fasteners 12 are wet-installed by conventional techniques through fastener holes 64, which include applying a full faying surface sealant to the shank 24 not in the threaded area. The metallic nuts are torqued within the working life of the sealant. Excess sealant is removed after the installation of the fasteners 12 have been verified for proper grip length; head flushness, torque value and sealant squeeze out.

Finally, in Step 210, the layers of primer 32 and paint 42 are reapplied over the fiberglass ply 62 and fasteners 12 in a method similar to that described above in forming the original painted and primed surface. The resultant repair is shown in FIG. 5.

Figure 7:
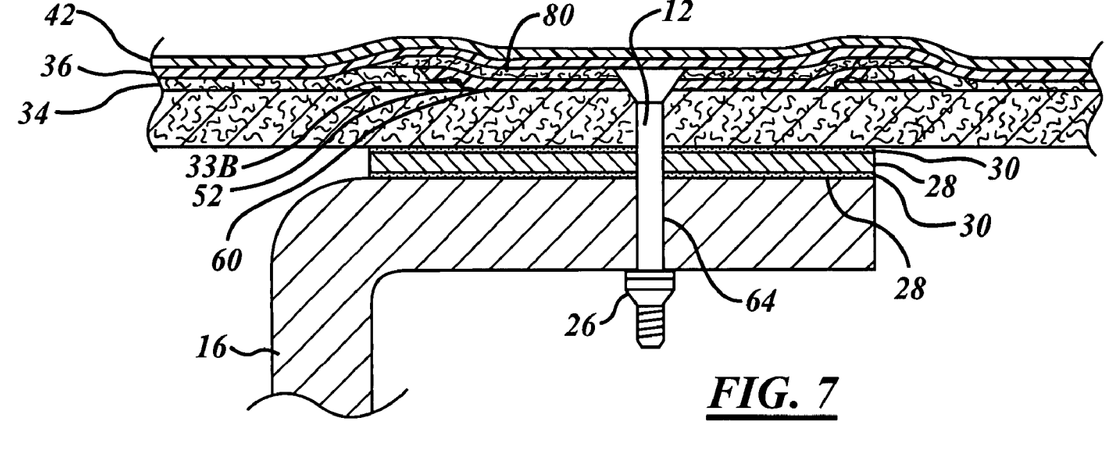
FIG. 7 is a section view of a repaired wing structure of FIG. 1 repaired in accordance with the logic flow diagram of FIG. 6.

Referring now to the logic flow diagram of FIG. 6, and as further shown in FIG. 7, in another preferred method of the disclosure, Steps 300-360 are first performed utilizing the same materials and in exactly the same manner as Steps 100-160 above.

Next, in Step 370, a layer of fiberglass prepreg 80 is applied onto the applied copper patch 53. The fiberglass prepreg 80 consists of E-glass fabric pre-impregnated with either a 250- or 350-degree Fahrenheit curing thermosetting epoxy resin. The fiberglass prepreg 80 is cut to fit with a 0.5-inch overlap over the periphery of the repaired area 54.

In Step 380, the epoxy components of the fiberglass prepreg 80 and epoxy film adhesive 60 of the patch 53, are simultaneously cured using a vacuum bag technique and a heat blanket when the curing temperatures of the unsupported film adhesive and the epoxy component of the prepreg 80 are the same. For the 250-degree cure, a temperature of about 255+/−10 degrees Fahrenheit for about 2 hours using a vacuum bag technique and a heat blanket is utilized. For the 350-degree Fahrenheit cure, a temperature of about 355+/−10 degrees Fahrenheit for about 2 hours using a vacuum bag technique and a heat blanket is utilized. The heat blanket and vacuum are then removed and the cured layers of both the prepreg 80 and adhesive 60 are cooled.

Alternatively, as shown in Step 365 and 375, when the curing temperature of the unsupported film adhesive 60 is different than the curing temperature of the epoxy component of the prepreg 80, a different method is utilized.

First, as shown in Step 365, the unsupported film adhesive 60 is cured as in the method of Step 170 above to bond the copper foil section 52 to the skin 14.

Next, in Step 375, the epoxy prepreg 80 is layed onto the copper foil section 52 and separately cured. For the 250-degree Fahrenheit cure thermosetting epoxy adhesive, a temperature of about 255+/−10 degrees Fahrenheit for about 2 hours using a vacuum bag technique and a heat blanket is utilized. For the 350-degree Fahrenheit cure thermosetting epoxy adhesive, a temperature of about 355+/−10 degrees Fahrenheit for about 2 hours using a vacuum bag technique and a heat blanket is utilized. The cured layers of both the prepreg 80 and adhesive 60 are then cooled.

Next, in Step 390, proceeding either from Step 375 or 380, new fastener holes 64 are drilled through the fiberglass prepreg 80, the copper foil section 52, skin 14, and through into the underlying shim 28 and spar 16 as described above in Step 190.

In Step 400, fasteners 12 are reinserted and secured substantially as describe above in Step 200.

Finally, in Step 410, the layers of primer 36 and paint 42 are reapplied and cured onto the fiberglass prepreg 80 and cover the fasteners 12 using techniques described above in Step 210. The resultant repaired wing structure 10 is best illustrated in FIG. 7.

The disclosure thus describes two preferred methods for repairing composite wing structures 10 damaged in lightning strikes or by some other mechanical means. This repair helps to maintain the integrity of the lightning prevention system to help divert lightning currents away from the fuel tank substructures by providing a lower resistance path along the wing's surface. The repair also maintains the reduction of current density at the target fasteners by allowing current sharing to the neighboring fasteners due to the reduced parallel path resistance created by the copper foil.

The methods of the preferred embodiments are relatively simple and cost effective, in that they utilize standard composite repair materials and can be performed easily in a relatively short amount of time. This limits the amount of down time for repair of commercial aircraft, therein allowing the aircraft to spend more time transporting passengers and cargo.

While the embodiments of the disclosure have been described in terms of preferred embodiments, it will be understood, of course, that the disclosure is not limited thereto since modifications may be made by those skilled in the art, particularly in light of the foregoing teachings.

What is claimed is:

1. A method for repairing the reduced impedance of an electrically conductive layer contained on an aircraft composite skin the method comprising:
    removing any paint and/or fiberglass plies located over an area of the composite skin to reveal a section of the electrically conductive layer;
    removing one or more fasteners within said section of the electrically conductive layer, wherein removing each of said one or more fasteners leaves a respective fastener hole;
    removing a portion of a copper foil grid within said section of the electrically conductive layer to reveal an underlying composite skin;
    forming a copper patch from a section of replacement copper foil and an unsupported film adhesive;
    introducing said copper patch over said underlying composite skin such that an outer portion of said patch overlaps an overlapping region of an unremoved portion of the copper foil grid and wherein said unsupported film adhesive of said copper patch contacts said underlying composite skin and said overlapping region;
    coupling a layer of a resin impregnated fiberglass material over said copper patch;
    coupling said copper patch to said underlying composite skin; and
    introducing a polytetrafluoroethlyene plug within each of said respective fastener holes.

2. The method of claim 1 wherein coupling a copper patch to said underlying composite skin comprises:
    curing said unsupported film adhesive material; and
    curing said resin impregnated fiberglass material.

3. The method of claim 2, wherein said unsupported film adhesive material comprises an unsupported thermosetting modified epoxy resin film adhesive material.

4. The method of claim 2, wherein coupling said resin impregnated fiberglass material over said copper patch comprises:
   forming a resin-impregnated fiberglass fabric;
   wet-laying said resin-impregnated fabric onto said copper patch; and
   curing said resin-impregnated fiberglass fabric.

5. The method of claim 4, wherein forming said resin-impregnated fiberglass fabric comprises:
   placing a first layer of a solid parting film on a relatively level surface;
   introducing a first amount of a 150 degree Fahrenheit curing thermosetting modified epoxy resin onto said first layer;
   introducing a layer of an E-glass fabric onto said first amount;
   introducing a second amount of said 150 degree Fahrenheit curing thermosetting modified epoxy resin onto said layer of an E-glass fabric, said second amount approximately equal in weight to said first amount;
   coupling a second layer of said solid parting film onto said second amount; and uniformly impregnating said layer of said E-glass fabric with said first amount and said second amount of resin to form a single ply resin-impregnated fiberglass fabric.

6. The method of claim 5, wherein wet-laying said resin-impregnated fiberglass fabric onto said copper patch comprises:
   removing said first layer of said solid parting film from said single ply;
   coupling said resin impregnated fabric onto said copper foil section of said copper patch such that said second layer of said solid parting film does not contact said copper foil section; and
   removing said second layer of said solid parting film from said resin-impregnated fiberglass fabric.

7. The method of claim 5, wherein curing said resin impregnated fiberglass fabric comprises:
   coupling a heat blanket to said resin impregnated fiberglass fabric;
   increasing a temperature of said heat blanket to about 200 degrees Fahrenheit for about 220 minutes to cure said 150 degree curing thermosetting modified epoxy resin; and
   removing said heat blanket.

8. The method of claim 7, wherein curing said unsupported film adhesive material comprises:
   coupling a heat blanket to said unsupported film adhesive, wherein said unsupported film adhesive comprises a 250 degree curing thermosetting modified epoxy film unsupported film adhesive;
   increasing the temperature of said heat blanket slowly to about 255 degrees Fahrenheit;
   heating said unsupported film adhesive for about 90 minutes; and
   removing said heat blanket from said unsupported film adhesive.

9. The method of claim 7, wherein curing said unsupported film adhesive material comprises:
   coupling a heat blanket to said unsupported film adhesive, wherein said unsupported film adhesive comprises a 350 degree curing thermosetting modified epoxy film unsupported film adhesive;
   increasing the temperature of said heat blanket slowly to about 355 degrees Fahrenheit;
   heating said unsupported film adhesive for about 90 minutes; and
   removing said heat blanket from said unsupported film adhesive.

10. The method of claim 3, wherein
   coupling said resin impregnated fiberglass fabric over said copper patch comprises coupling a fiberglass prepreg material onto said replacement copper foil section of said copper patch.

11. The method of claim 10, wherein curing said resin impregnated fiberglass material comprises:
   coupling a heat blanket to said fiberglass prepreg material, said fiberglass prepreg material having a 250-degree Fahrenheit curing thermosetting modified epoxy component;
   increasing a temperature within said heat blanket to about 250 degrees Fahrenheit;
   maintaining said heat blanket at about 250 degrees Fahrenheit for about 120 minutes to cure said 250-degree Fahrenheit curing epoxy component of said fiberglass prepreg material; and
   removing said heat blanket from said fiberglass prepreg material.

12. The method of claim 10, wherein curing said resin impregnated fiberglass material comprises:
   coupling a heat blanket to said fiberglass prepreg material, said fiberglass prepreg material having a 350-degree Fahrenheit curing thermosetting modified epoxy component;
   increasing a temperature within said heat blanket to about 350 degrees Fahrenheit;
   maintaining said heat blanket at about 350 degrees Fahrenheit for about 120 minutes to cure said 350-degree Fahrenheit curing epoxy component of said fiberglass prepreg; and
   removing said heat blanket from said fiberglass prepreg material.

13. The method of claim 1, wherein removing any surfacers located over a damaged area of the composite wing comprises:
   removing an outer paint layer and an outer primer area over a damaged area plus a two inch radial extended area using a 150 grit or finer sandpaper, therein exposing an underlying composite ply fiberglass material;
   coupling a high or low pressure adhesive tape along the radial periphery or said underlying composite ply material to mask said underlying composite ply material;
   sanding said underlying composite ply material, therein exposing an underlying copper foil strip of a copper foil grid;
   removing said high or low pressure adhesive tape to expose a fiberglass ply surrounding said underlying copper foil strip; and
   solvent washing said exposed fiberglass ply.

14. The method of claim 1, further comprising:
   introducing a mixture of milled glass fiber and a 150 degree Fahrenheit curing modified epoxy resin around said polytetrafluoroethylene plug; and
   curing said 150-degree Fahrenheit curing modified epoxy resin.

15. The method of claim 2, further comprising installing one or more fasteners through said cured resin impregnated fiberglass material, said copper patch, and said underlying composite skin.

16. A method for repairing the reduced impedance of an electrically conductive layer contained on an aircraft composite skin the method comprising:

removing any paint and/or fiberglass plies located over an area of the composite skin to reveal a section of the electrically conductive layer;

removing one or more fasteners within said section of the electrically conductive layer, wherein removing each of said one or more fasteners leaves a respective fastener hole;

removing a portion of a copper foil grid within said section of the electrically conductive layer to reveal an underlying composite skin;

forming a copper patch from a section of replacement copper foil and an unsupported film adhesive;

introducing said copper patch over said underlying composite skin such that an outer portion of said patch overlaps an overlapping region of an unremoved portion of the copper foil grid and wherein an unsupported film adhesive contacts said underlying composite skin and said overlapping region; and coupling a layer of a resin impregnated fiberglass material over said copper patch; and curing said unsupported film adhesive and said impregnated fiberglass material;

introducing a polytetrafluoroethlyene plug within each of said respective fastener holes;

introducing a mixture of milled glass fiber and a 150 degree Fahrenheit curing modified epoxy resin around said polytetrafluoroethylene plug; and curing said 150-degree Fahrenheit curing modified epoxy resin.

17. The method of claim 1, further comprising:

drilling a new fastener hole through said cured resin impregnated fiberglass material, said copper patch, said underlying composite skin material, a shim and a composite spar;

wet-installing an undamaged bolt within said new fastener hole;

attaching a shank portion of said undamaged bolt with a metallic nut.

* * * * *